US008958415B2

(12) United States Patent
de Franca Lima et al.

(10) Patent No.: US 8,958,415 B2
(45) Date of Patent: Feb. 17, 2015

(54) METHOD AND APPARATUS FOR CONGESTION CONTROL FOR INTER-WORKING COMMUNICATION NETWORKS

(75) Inventors: Octavio Jose de Franca Lima, The Colony, TX (US); Gunnar Mildh, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 754 days.

(21) Appl. No.: 12/902,712

(22) Filed: Oct. 12, 2010

(65) Prior Publication Data

US 2011/0110228 A1    May 12, 2011

Related U.S. Application Data

(60) Provisional application No. 61/251,166, filed on Oct. 13, 2009.

(30) Foreign Application Priority Data

Feb. 8, 2010    (WO) ................. PCT/SE2010/050147

(51) Int. Cl.
*H04L 12/66*    (2006.01)
*H04W 36/22*    (2009.01)
(Continued)

(52) U.S. Cl.
CPC .............. *H04W 36/22* (2013.01); *H04W 28/08* (2013.01); *H04W 36/0022* (2013.01); *H04W 36/0066* (2013.01)
USPC ........................................................ 370/352

(58) Field of Classification Search
None
See application file for complete search history.

(56) References Cited

U.S. PATENT DOCUMENTS

2008/0159160 A1*  7/2008  Das et al. ................. 370/252
2009/0257412 A1* 10/2009  Kuokkanen ............... 370/338
(Continued)

FOREIGN PATENT DOCUMENTS

CN    101296518 A    10/2008
CN    101433028 A    5/2009

OTHER PUBLICATIONS

3RD Generation Partnership Project. 3GPP TS 23.272, V9.1.0 (Sep. 2009), 3rd Generation Partnership Project; Technical Specification Group Services and System Aspects; Circuit Switched Fallback in Evolved Packet System; Stage 2 (Release 9), Sep. 2009.

(Continued)

*Primary Examiner* — Minh-Trang Nguyen
(74) *Attorney, Agent, or Firm* — Coats & Bennett, P.L.L.C.

(57) ABSTRACT

A method for allowing distribution of congestion-related information between a cellular communication system supporting circuit-switched services and a cellular communication system supporting packet-switched services. A message destined for the packet-switched communication system is identified at the circuit-switched communication system, and congestion-related information, indicating the present congestion status of the circuit-switched communication network is included into the message. The message is then forwarded to a network node of the packet-switched communication system, where either a user equipment or the network node of the first cellular communication system can control Circuit-switched Fallback (CSFB) attempts towards the second communication system on the basis of the congestion-related information prior to having to initiate any access signaling associated with the CSFB attempts.

17 Claims, 5 Drawing Sheets

(51) Int. Cl.
*H04W 28/08* (2009.01)
*H04W 36/00* (2009.01)

(56) References Cited

U.S. PATENT DOCUMENTS

| | | | | |
|---|---|---|---|---|
| 2010/0113010 | A1* | 5/2010 | Tenny et al. | 455/423 |
| 2010/0195568 | A1* | 8/2010 | Iimori | 370/328 |
| 2010/0316000 | A1* | 12/2010 | Burbidge et al. | 370/328 |
| 2011/0014919 | A1* | 1/2011 | Otte et al. | 455/442 |
| 2011/0077011 | A1* | 3/2011 | Wang et al. | 455/445 |
| 2011/0080867 | A1* | 4/2011 | Mildh | 370/328 |
| 2012/0294149 | A1 | 11/2012 | Kazmi et al. | |

OTHER PUBLICATIONS

3RD Generation Partnership Project. "Handling of Congestion for e1xCSFB." 3GPP TSG-RAN WG2 Meeting #68, R2-096712, Jeju, Korea, Nov. 9-13, 2009.

3RD Generation Partnership Project. "Addition of 1xRTT Persistence Parameters to SIB8." 3GPP TSG-RAN WG2 Meeting #67bis, R2-095644, Miyazaki, Japan, Oct. 12-16, 2009.

3RD Generation Partnership Project. "CR to 36.331 for 1xRTT Persistence Parameters in SIB8." 3GPP TSG-RAN-WG2 Meeting #67bis, R2-095645, Miyazaki, Japan, Oct. 12-16, 2009.

* cited by examiner

US 8,958,415 B2

METHOD AND APPARATUS FOR CONGESTION CONTROL FOR INTER-WORKING COMMUNICATION NETWORKS

RELATED APPLICATIONS

This application claims priority under 35 U.S.C. §120 to international patent application Serial No. PCT/SE2010/050147, filed Feb. 8, 2010, and under 35 U.S.C. §119(e) to U.S. provisional patent application Ser. No. 61/251,166, filed Oct. 13, 2009. The entire contents of each of the aforementioned applications are incorporated by reference herein.

TECHNICAL FIELD

The present invention relates generally to wireless communications and in particular to methods and nodes for communicating congestion information between packet-switched and circuit-switched cellular telephony technologies.

BACKGROUND ART

As wireless communication networks have become ubiquitous in many parts of the world, a variety of communications technologies and protocols have been developed and standardized for providing inter-working functionality between communication networks that are based on different technologies. The Third Generation Partnership Project (3GPP) defines cellular telephone technologies such as the Global System for Mobile communications (GSM), Wideband Code Division Multiple Access (WCDMA), the packet-switched based Long Term Evolution (LTE) and the Evolved UMTS Terrestrial Radio Access Network (E-UTRAN). Similarly, 3GPP2 defines cellular telephony technologies, such as CDMA 2000, including a single-carrier Radio Transmission Technology (1xRTT), which supports circuit-switched services and High Rate Packet Data (HRPD). The 3GPP and 3GPP2 bodies further define inter-working functionality between several of these systems.

One such inter-working functionality is the support for Circuit-switched Fall Back (CSFB) to 1xRTT, also known as enhanced CSFB to 1xRTT (e1xCSFB). e1xCSFB is characterized in that an end user equipment (UE) that supports both the LTE and 1xRTT radio interface (although not at the same time) and that camps in LTE may handle any Circuit-switched (CS) call in 1xRTT. This means that the UE switches over, or is handed over by the network, to 1xRTT whenever it is involved in a Mobile Terminated (MT) or Mobile Originated (MO) call.

Such a scenario is exemplified in FIG. 1, which is a simplified illustration of an LTE system 100 interconnected with an 1xRTT system 101, where an 1xCS CSFB enabled UE, hereinafter referred to as UE 102, may access the LTE system 100 via E-UTRAN 103. E-UTRAN 101 is interconnected to the 1xRTT system 101 via a Mobility Management Entity (MME) 104 and an Interworking System (1xCS IWS) 105.

For MT calls it is required that the UE 102 receives a page message from the 1xRTT system 101 in order to make it aware of an incoming call received via 1xRTT Mobile Switching Center (MSC) 104. This page message is sent from the 1xRTT system 101 via the LTE system 100 as a data or signaling message. For such a paging process to work, the UE 102 first needs to register to the 1xRTT system 101 via the LTE system 100. In addition, the e1xCSFB procedure for MT/MO calls also relies on UE 102 signaling to the 1xRTT system 101 to make necessary preparations, such as resource preparations in the 1xRTT system 101, before the UE 102 can switch over to the LTE system 100, wherein this signaling is typically tunneled via the LTE system 100. CSFB is further specified in the 3GPP Technical Specification TS 23.272, "Circuit-switched (CS) fallback in Evolved Packet System (EPS); Stage 2".

There is, however, no congestion control mechanism defined in e1xCSFB that indicates when the 1xRTT system is overloaded, and consequently there is no support for reducing the load originating from incoming MT/MO call attempts in situations where the 1xRTT is overloaded. For UE accesses performed directly in the 1xRTT system, such functionality may be handled on the basis of persistence parameters (PSIST), which are normally broadcasted via the 1xRTT cells of the 1xRTT system. In such a situation PSIST may be used to inform the UE of information such as whether it is allowed to access an 1xRTT cell and/or the probability of establishing a connection with the 1xRTT system.

For the internal congestion control to work also for e1xCSFB MT/MO call attempts, a proposal referred to as "Addition of 1xRTT persistent parameters to SIB8" and 3GPP TSG-RAN WG2 Meeting "67bis R2-095645,"CR to 36.331 for 1xRTT persistence parameters in SIB8" has been presented in 3GPP TSG-RAN WG2 Meeting #67bis R2-095644. In the mentioned proposal it is suggested that 1xRTT persistence parameters are broadcasted also in the LTE broadcast channel. In the mentioned examples the information is broadcasted in System Information Block (SIB) 8. When a network operator detects that there is overload in the 1xRTT system, it will update the PSIST parameters in the LTE system so that the load of incoming e1xCSFB attempts is reduced, or even completely stopped, for a certain time period. The UE will then read the PSIST parameters before attempting to perform the e1Xcsfb and in the event of congestion the attempt will be stopped before the UE performs any signaling for starting the CSFB procedures towards the LTE system.

A significant problem with this solution is that there is no standardized mechanism for making the congestion situation in the 1xRTT system known also in the LTE system. Even though it would be possible for the operator to use some proprietary inter-working/signaling between the Operation and Maintenance (OAM) systems of the LTE and 1xRTT systems to pass the congestion information between the two systems, this alternative has the disadvantage that, due to the absence of standardization, special solutions that may depend on the operators of the two inter-connected systems and the LTE/1xRTT vendors involved will be required.

Furthermore, the congestion can in many cases be of a more-or-less dynamic nature, and may also depend on unforeseen events in the cellular networks or events which are very difficult to predict, such as sports or music performances, which typically may result in a large instantaneous occasional influx of people, traffic accidents or congestions, which may result in an occasional increase in cellular traffic in the cellular networks. Any of these events may result in the OAM systems having to update or trigger an update of the PSIST parameters dynamically. However, OAM systems are normally not designed to handle dynamic functionality, which is normally handled by the traffic functions and via signaling.

SUMMARY OF INVENTION

Several embodiments of the present invention address at least some of the issues mentioned above. More specifically, embodiments of the present invention include methods for enabling distribution of congestion-related information between two different types of communication systems by reusing already established signaling. Other embodiments include apparatus that are adapted to execute the suggested methods.

According to one aspect a method in a network node of a second communication system supporting circuit-switched services for handling signaling transported between a first cellular communication system supporting packet-switched services and the second cellular communication system is provided.

The method enables the network node to use signaling that has already been initiated for distribution of congestion-related information between the two systems. As a result, excessive signaling is avoided, and no specially configured infrastructure is needed for providing the suggested information distribution.

Once the network node has identified a message destined for the first cellular communication system, it includes congestion-related information, which is indicative of the present congestion status of the second cellular communication system, into the message and forwards the message to a network node of the first cellular communication system.

Once transmitted to the receiving network node of the first cellular communication system, it may be used by user equipments which have access to the congestion-related information via the receiving network node and/or by the receiving network node itself to control Circuit-switched Fallback (CSFB) attempts towards the second communication system.

Because of the suggested distribution procedure, CSFB attempts can be processed prior to having to initiate any access signaling associated with the CSFB attempts, and thus, processing of CSFB attempts can be performed more efficiently, without requiring any excessive signaling.

According to another aspect, a method in a network node of a first cellular communication system supporting packet-switched services is provided. According to this method, a message transmitted from a second cellular communication system supporting circuit-switched services is received, and recognized as containing congestion-related information associated with the second cellular communication system, after which the network node of the first cellular communication system is updated with the congestion-related information.

As indicated above, the updated information may then be used for controlling of CSFB attempts either by the receiving network node, user equipments which gain access to the information, or both categories of controllable means.

Upon receiving a CSFB attempt the congestion-related information may be used as criteria for making a decision on the attempt such that it is blocked in the event that the updated congestion-related information is indicating congestion, or admitted in the event that the updated congestion-related information is not indicating congestion. Thereby, a qualified decision can be taken at the receiving network node, whereby during congestion attempts destined to fail can be avoided, and, thus signaling between the two systems will be reduced.

To enable control of CSFB attempts already at the user equipments having access to the first communication system, the method may be extended such that at least a part of the congestion-related information is broadcasted. Thereby, user equipments camping in the first communication system will be able to control CSFB attempt on the basis of the broadcasted information.

In addition to containing information indicating simply whether or not the second cellular communication system is congested, the congestion-related information may also contain information on the severity of the congestion and/or an indication on how long the congestion-related information is valid.

By making use of the suggested distribution mechanism, congestion-related information may be transmitted either via a message associated with CSFB signaling, or via a message of any other signaling, thereby allowing for a flexibility, as to the ability to keep the first communication system updated with congestion-related information.

The method is especially suitable in situations where the second communication system is a 1xRTT communication system, and more specifically when controlling CSFB attempts which are CSFB attempts to the 1xRTT (e1xCSFB) of the second cellular communication system.

In some embodiments, the congestion-related information comprises persistence (PSIST) parameters of the second cellular communication system.

According to another aspect, a network node of a second cellular communication system which is configured to provide congestion-related information the first cellular communication system, according to the first method mentioned above is provided. The network node comprises a message identifying unit which is configured to identify a message destined for the first cellular communication system and an updating unit, which is connected to the message identifying unit and configured to include congestion-related information into the identified message. The network node also comprises a communication unit, connected to the message identifying node and configured to forward the message to a receiving network node of the first cellular communication system.

By using signaling procedures which are already established for supporting execution of CSFB or registration for CSFB, congestion-related information may be distributed automatically between the two systems. According to one embodiment, the communication unit may therefore be configured to transmit messages to the first cellular communication system as tunneling messages over the S102/A21 interface and the S1 interface, which are already used for CSFB signaling.

In some scenarios, the updating unit may be configured to insert congestion-related information which comprises persistence (PSIST) parameters of the second cellular communication system.

According to yet another aspect, another network node of a first cellular communication system supporting packet-switched services, which may be referred to as a receiving network node, is provided. The receiving network node comprises a first communication unit, which is configured to receive a message transmitted from the second cellular communication system and to recognize that the message comprises congestion-related information of the second cellular communication.

The receiving network node also comprises an updating unit, which is connected to the first communication unit and configured to update a database of the receiving network node with the congestion-related information, thereby enabling later access to the congestion-related information in association with receiving a CSFB attempt.

The updating unit may be configured to explicitly update persistence (PSIST) parameters of the second cellular communication system on the basis of the congestion-related information obtained from the second communication system.

The receiving network node may also comprise broadcasting facilities, which may be provided, for example, by a second communication unit which is configured to broadcast at least a part of the updated congestion-related information, such that user equipments camping in the first cellular communication system will be able to obtain an indication of the congestion status of the second cellular communication system on the basis of the congestion-related information.

In order to be able to handle CSFB attempts at the receiving network node, the controlling unit may be configured to admit a CSFB attempt in the event that no congestion is indicated by the congestion-related information, while a CSFB attempt is blocked in the event that congestion is indicated by the congestion-related information. Alternatively, the controlling unit may be configured to change the valid CSFB release to a version which is more suitable for the present situation. This alternative may be suitable when the grade of congestion is known from the congestion-related information, for example.

Depending on issues such as the amount of signaling with the second communication system that is normally handled by the different network nodes of the first communication system, the receiving network node may be, for example, an eNode B or an MME.

The foregoing and other objects, features, aspects and advantages of the present invention will become better understood from the detailed description provided herein below with appropriate reference to the accompanying drawings.

BRIEF DESCRIPTION OF DRAWINGS

The invention is now described, by way of example, with reference to the accompanying drawings, in which.

DETAILED DESCRIPTION

In the following, methods for enabling congestion-related information transfer between two inter-connected cellular communication systems will be described in further detail. More specifically the methods include a method for enabling congestion-related information of a cellular communication system that supports circuit-switched services to be available also to another inter-connected cellular communication system, supporting packet-switched services, without requiring any dynamic inter-working activities between respective OAM systems for the two communication systems. In addition, cellular communication systems that are configured to execute the suggested method will also be described in further detail below.

One reason for using the suggested method is to enable user equipments and/or the infrastructure of the terminating communication system to use the congestion-related information as a basis for decisions on upcoming CSFB attempts. By utilizing a transporting mechanism which requires a small amount of resources for the purpose of keeping congestion-related information updated and accessible during CSFB attempts, the signaling between the two communication systems may be considerably reduced.

The suggested methods rely on an information distribution mechanism that enables congestion-related information to be transmitted between the two communication systems, using already established signaling. More specifically it is suggested that in the circuit-switched services supporting communication system, congestion-related information is added to a message destined for the other communication system, such that the information can be transferred between the two systems and used by the terminating system, without requiring any excessive signaling.

Figure 1:
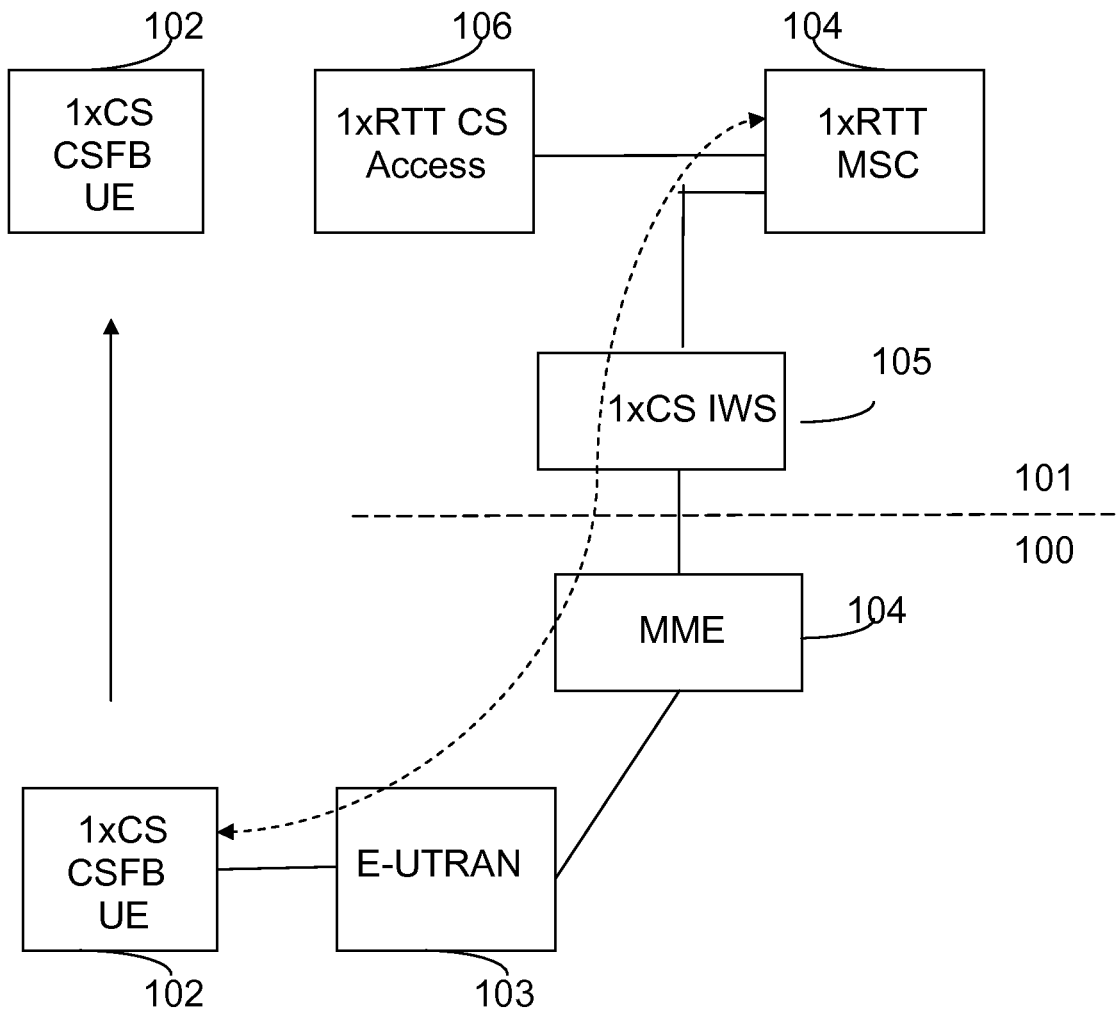
FIG. 1 is a simplified scenario illustrating two inter-connected communication systems which are adapted to support inter-working functionality, according to the prior art.
Figure 2:
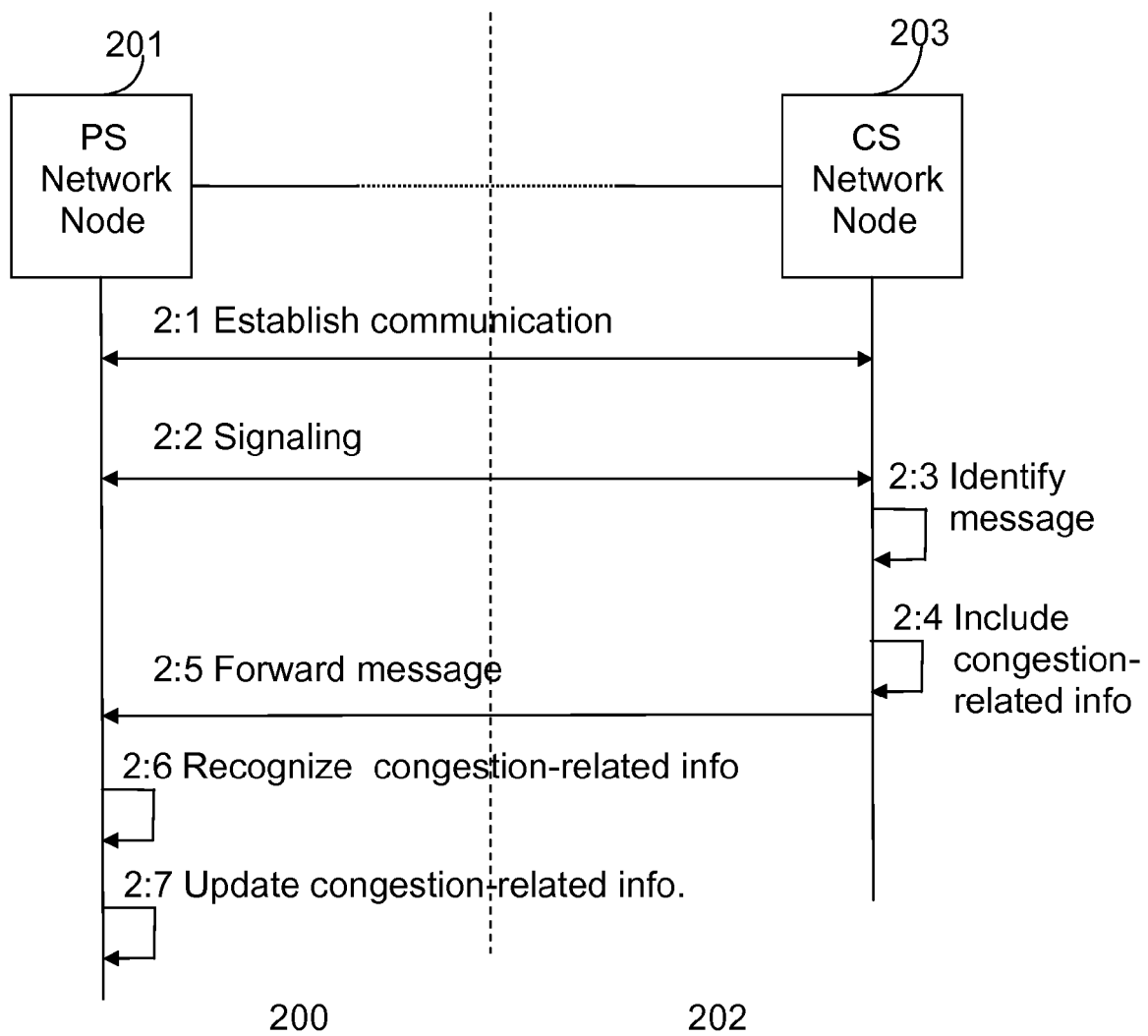
FIG. 2 is a simplified signaling scheme illustrating method steps for providing congestion relate information between two different communication systems, according to one exemplary embodiment.

The suggested methods will now be described in further detail with reference to the schematic signaling diagram of FIGS. 2 to 3b. It is to be understood that FIGS. 2 to 3b are simplified illustrations describing the general principles on which the suggested method is based, and that two inter-connected systems rely on a plurality of additional functional entities, typically including at least the functional entities mentioned above with reference to FIG. 1. However, for simplicity reasons, entities and nodes which are commonly used in the described context but which are not necessary for the understanding of the suggested method have been omitted in these Figures.

In FIG. 2 a communication system 200 that supports packet-switched services is represented by a Packet-switched (PS) Network Node 201, hereinafter referred to as a PS communication system, and is inter-connected to another communication system 202 which is configured to support circuit-switched services, hereinafter referred to as a CS communication system. The PS communication system 200 may be an LTE based system, in some embodiments, while the CS communication system 202 may be a 1xRTT system. It is to be understood that the two communication systems are inter-connected via additional functional communication system nodes providing conventional functionality which is normally necessary for providing the required inter-working functionality (not shown).

The CS communication system may be configured according to a known CS standard such as the Global System for Mobile communications (GSM), the Wideband Code Division Multiple Access (WCDMA) standard, or the packet-switched Long Term Extensions (LTE) to the Evolved Terrestrial Radio Access Network (E-UTRAN), while the PS communication system may be configured according to the Code Division Multiple Access 2000 (CDMA 2000) standard, for example, when including the single-carrier Radio Transmission Technology (1xRTT). In the latter case the CS network node 203 may be a 1xCS IWS or a 1xRTT MSC.

As a prerequisite, it is also to be understood that a communication involving the network nodes 201,203 has already been established between the two communication systems 200,202, as indicated with a first step 2:1. At least some signaling, represented in the Figure by step 2:2, being used between the two communication systems 200,202 is pre-defined to be used as a carrier for delivery of congestion-related information between the two systems, and more specifically in the direction of the CS communication system 202 towards the PS communication system 200.

As indicated with another step 2:3, CS network node 203 identifies a message of such signaling from the messages which are transmitted in the required direction and destined for the PS communication system 200. Such a message may either be a message which is created at CS network node 203 for the purpose of supporting any type of information exchange between the two systems 200,202, or a message which is created at another node of the CS communication system 202, but which is handled by CS network node 203 when being transmitted to PS network node 201.

In a next step 2:4 congestion-related information, i.e., information that is indicative of the present congestion situation or status of the CS communication system 202 CS, is added to the message, e.g., by using the known piggybacking procedure when adding the content onto the message.

According to another alternative embodiment, an information element of an identified message may instead be modified, such that in the event of congestion, a cause value of the message is changed from "OK" to "congested".

The message, now comprising not only its original data but also the added congestion-related information, is then forwarded to the PS communication system 200 and the PS network node 201, as indicated with a next step 2:5.

The congestion-related information may be obtained from some type of conventional congestion control mechanism. The source from which this information is obtained is, however, irrelevant for the present invention, and, for that reason these aspects of the described process will not be described in any further detail in this document.

Once forwarded to the PS network node 201, the message is processed accordingly, whereby, in addition to the conventional data, for which the message was originally standardized, also congestion-related information is recognized, as indicated with a step 2:6. Subsequently, the recognized information is used to update a storage means of PS network node 201, with the retrieved congestion-related information, as indicated with a final step 2:7.

Typically, the signaling used for the forwarding of the congestion-related information may be selected from signaling which is distributed via the S102 and S1/A21 and the S1 interface, as tunneling messages. Such signaling may comprise CSFB signaling, for example, or signaling that is used for paging or UE registration purposes. Furthermore, the congestion-related information may comprise rather rough information, which is indicating whether the CS communication system is congested or not, or more detailed information, such as information on the severity of the congestion and/or an indication on how long the congestion relate information is valid, e.g., for the next 5 minutes. The congestion-related information may, comprise, at least partly, the Persistent Parameters (PSIST) of the CS communication system.

Once the congestion information has been forwarded to and updated at the PS communication system 200 the retrieved information may be used for the purpose of controlling upcoming CSFB attempts originating at the PS communication system 200. In case the CS communication network is a 1xRTT system, the CSFB attempts will be referred to as CSFB attempts to 1xRTT (e1xCSFB). Two alternative, exemplifying processes describing how the updated congestion-related information can be used for the mentioned purpose will now be described in further detail below, with reference to the signaling scheme of FIG. 3a.

An operator may prefer that the decisions of the CSFB attempts can be taken at different levels. For example, an operator may require that, in the event of congestion in the CS communication system, a CSFB attempt shall be blocked at the eNode B, at the MME or even already at the UE. The PS network node may therefore be an MME, or an eNode B, where in the latter case the congestion-related information is transmitted transparently from the CS communication system to the eNode B.

Figure 3A:
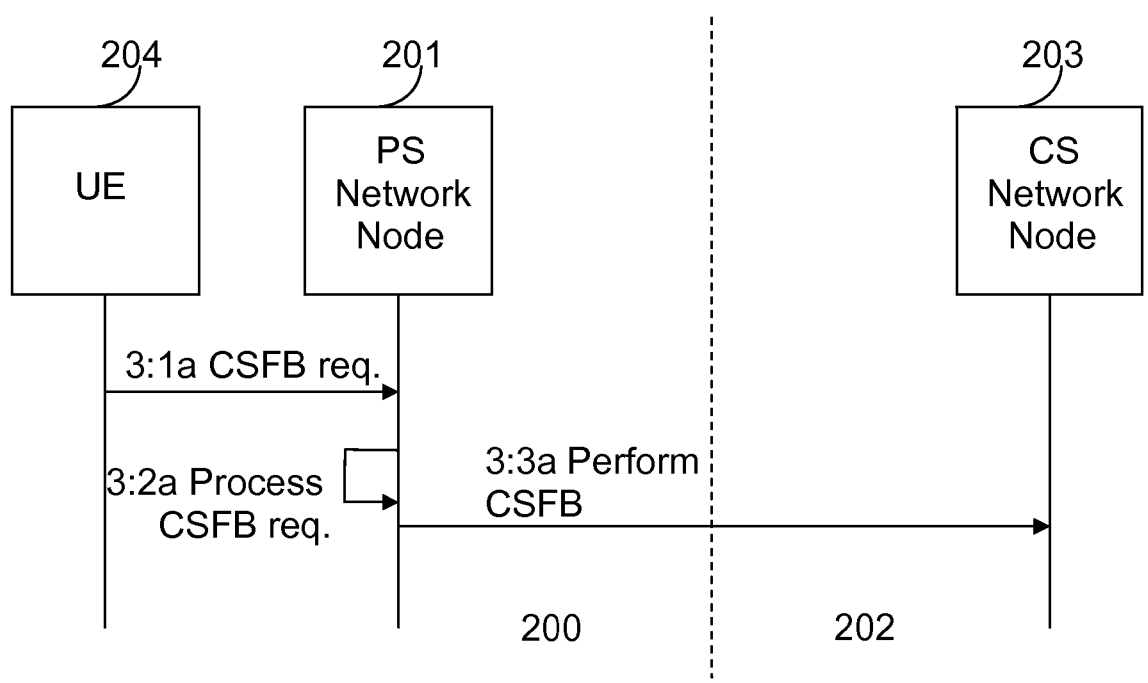
FIG. 3a is a simplified signaling scheme illustrating how congestion-related information obtained according to the steps presented with reference to FIG. 2 may be used during a CSFB attempt, according to one exemplary embodiment.
Figure 3B:
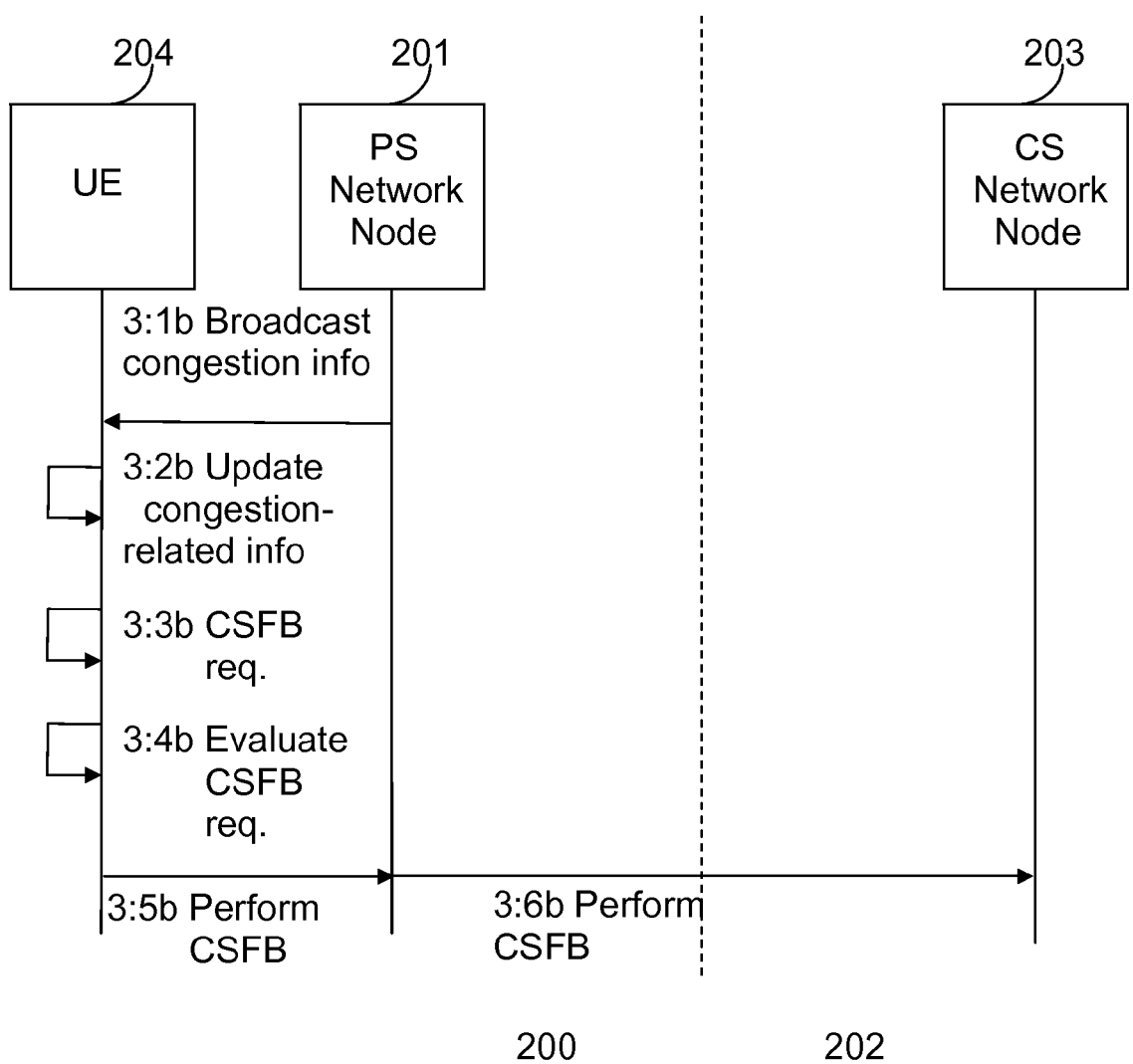
FIG. 3b is a simplified signaling scheme illustrating how congestion-related information obtained according to the steps presented with reference to FIG. 2 may be used during a CSFB attempt, according to another exemplary embodiment.

In resemblance to FIG. 2, FIG. 3a is an illustration of a PS communication system 200, being represented by PS network node 201, and a CS communication system 202, which is represented by CS network node 203. In addition, FIG. 3a comprises a UE 204 which may access the CS communication system 202 via CS network node 203, as indicated in the figure.

In a first step 3:1a, UE 204 initiates a CSFB attempt by transmitting a CSFB request to PS network node 201. At the PS network node 201 the CSFB request is being processed, as indicated with a step 3:2a. Since PS network node 201 has access to updated congestion-related information this information is used when the PS network node 201 makes the decision whether to allow or block the CSFB attempt. As already mentioned above, PS network node may be an eNode B or an MME to which the request of step 3:1a is forwarded. In case the result of the processing in step 3:2a is to allow the CSFB attempt, PS network node continues with the requested process, as indicated with the final step 3:3a. In case the attempt should instead be blocked, the process is terminated.

FIG. 3b is another signaling scheme which is illustrating another way of using the congestion-related information as a basis for deciding on CSFB attempts, where the decisions are instead taken at the UE.

According to FIG. 3b, which describes a configuration which corresponds to the one described above with reference to FIG. 3a, congestion-related information forwarded from the CS communication system 202 to the PS communication system 200 is distributed to the UE's which are accessible by PS network node 201, by way of broadcasting. This is indicated with a first step 3:1b. By broadcasting the congestion-related information, UE's which are camping in the PS communication system 200 will be able to obtain an indication of the congestion status of the CS communication system 202 on the basis of the congestion-related information.

At the UE, the received information is updated as indicated with another step 3:2b, typically by updating some type of conventional storage means. Once a CSFB request is registered at the UE 204, as indicated with a step 3:3b, the request is evaluated, taking the stored congestion-related information into consideration, as indicated with a step 3:4b, and in the event of no congestion the CSFB process is continued, on the initiative of the UE 204, as indicated with step 3:5b, by PS network node 201, as indicated with step 3:6b.

In order to perform the method described above, the two described communicating network nodes need to be configured accordingly. Below, a simplified CS network node configured according to one exemplary embodiment will be described in further detail with reference to FIG. 4, while a PS network node configured according to one exemplary embodiment will be described with reference to FIG. 5. It is to be understood that both nodes are simplified configurations where functional units that are normally used, or even compulsory in corresponding network nodes, but that are not necessary for the understanding of the suggested information handling mechanism, have been omitted for simplicity reasons.

Figure 4:
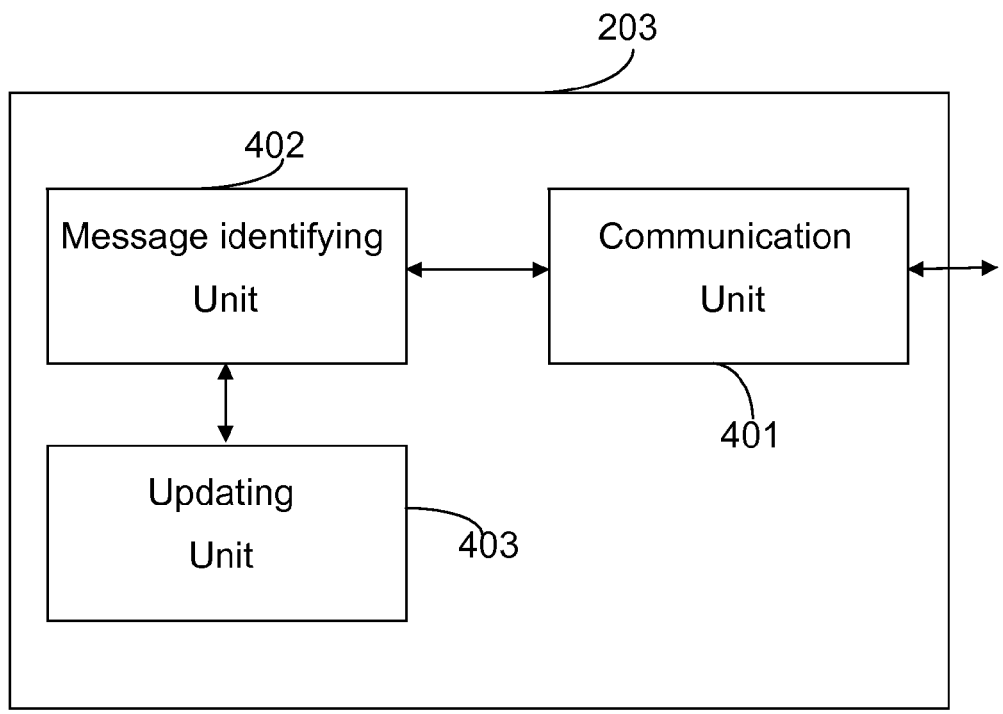
FIG. 4 is a simplified blocks scheme illustrating a configuration of a CS network node according to one exemplary embodiment, wherein the CS network node is suitable to perform the method suggested with reference to any of FIGS. 2-3b.

Referring to FIG. 4, CS network node 203 comprises a message identifying unit 402 which is configured to identify a message destined for the first cellular communication system and is connected to an updating unit which is configured to include congestion-related information, such as by way of piggybacking, into the identified message. The message identifying unit 402 may be configured to identify a suitable message received from another network node of the CS communication system in which CS network node 203 is located or to identify a suitable massage generated by the node 203 itself. Communication unit 401 is also configured to forward the message from the message identifying unit 402 towards the PS communication system 200.

Figure 5:
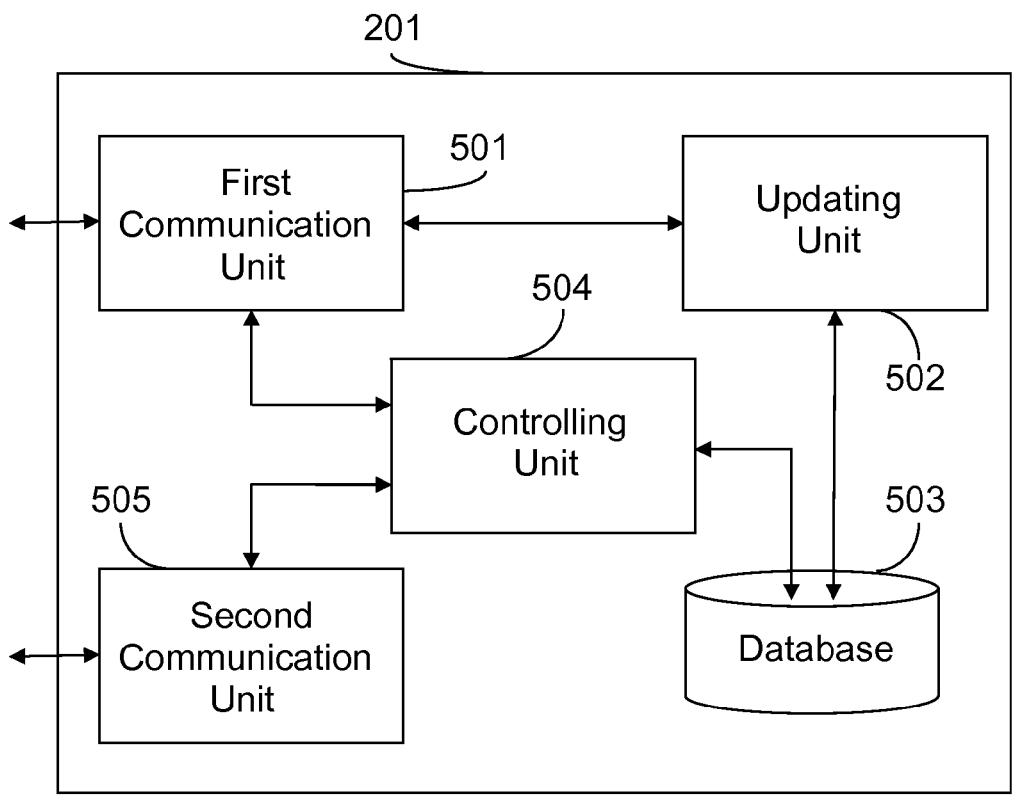
FIG. 5 is another simplified block scheme illustrating a configuration of a PS network node according to one exemplary embodiment, wherein the PS network node is suitable to perform the method suggested with reference to any of FIGS. 2-3b.

FIG. 5 describes an exemplary PS network node 201 comprising a first communication unit 501, which is configured to receive a message transmitted from the CS communication system and to recognize that the received message comprises congestion-related information of CS communication system.

The first communication unit 501 is connected to an updating unit 502, which is configured to update a database 503 of the PS network node 201 with the received congestion-related information. The PS network node 201 may also comprise a second communication unit 505, which is configured to broadcast at least a part of the updated congestion-related information. Alternatively, the PS network node 201 may comprise one single communication unit 501, which is configured to perform both communication tasks.

In order to be able to make efficient use of the retrieved congestion-related information, the controlling unit 504 may be further configured to make a decision as to whether a CSFB attempt should be allowed or admitted, or whether it should be denied or blocked, where the decision is based at least in part on the basis of the congestion-related information. Consequently a CSFB attempt is admitted in the event that no congestion is indicated by the congestion-related information, while the attempt is instead blocked in the event that congestion is indicated. As an alternative to blocking a CSFB attempt, the controlling unit 504 may instead, or under certain circumstances, be configured to change the valid CSFB release from the presently applied one to another one which is more suitable to the present congestion situation, in the event that congestion is indicated by the congestion-related information.

Which type of network node which is most suitable to use for the suggested purpose may depend on the amount of signaling between the two systems which is normally managed by the respective network node. A network node involved in more frequent signaling will provide for a more frequent updating of the congestion-related information. The network node 203 of the second communication system may be a 1xCS IWS or a 1xRTT MSC, for example, while the network node 201 of the first communication system may be an MME or an eNode B.

While the present invention has been described with reference to exemplary embodiments, the description is generally only intended to illustrate the inventive concept and should not be taken as limiting the scope of the invention, which is defined by the appended claims.

The invention claimed is:

1. A method in a network node of a first cellular communication system supporting packet-switched services for handling signaling transported between the first cellular communication system and a second cellular communication system supporting circuit-switched services, the method comprising:
receiving a message transmitted from the second cellular communication system and recognizing that the message comprises congestion-related information that is indicative of the present congestion status of the second cellular communication system; and
updating the network node of the first cellular communication system with the congestion-related information;
thereby enabling a user equipment for which the congestion-related information is accessible via the network node or the network node of the first cellular communication system to control Circuit-switched Fallback (CSFB) attempts towards the second communication system on the basis of the congestion-related information prior to initiating any access signaling associated with the CSFB attempts.

2. The method of claim 1, further comprising controlling a CSFB attempt by:
blocking a CSFB attempt if the congestion-related information indicates congestion; otherwise
admitting the CSFB attempt if the congestion-related information does not indicate congestion.

3. The method of claim 1, further comprising broadcasting at least a part of the congestion-related information, thereby enabling a user equipment camping in the first cellular communication system to control a CSFB attempt by blocking a CSFB attempt in the event that the broadcasted information indicates congestion, or by admitting a CSFB attempt in the event that the broadcasted information does not indicate congestion.

4. The method of claim 1, wherein the congestion-related information comprises information indicating whether or not the second cellular communication system is congested.

5. The method of claim 4, wherein if the congestion-related information indicates that the second cellular communication system is congested, then the congestion-related information further comprises at least one of information on:
the severity of the congestion; and
an indication of how long the congestion-related information is valid.

6. The method of claim 1, wherein the message is a message associated with CSFB signaling.

7. The method of claim 1, wherein the message is a message other than a CSFB signaling associated message.

8. The method of claim 1, wherein the second cellular communication system is a 1xRTT communication system.

9. The method of claim 8, wherein the Circuit-switched Fallback (CSFB) attempts are enhanced Circuit-switched Fallback (CSFB) attempts to the 1xRTT (e1xCSFB) of the second cellular communication system.

10. The method of claim 1, wherein the congestion-related information comprises persistence (PSIST) parameters of the second cellular communication system.

11. A network node of a first cellular communication system supporting packet-switched services, the network node being arranged to handle signaling transmitted between the first cellular communication system and a second cellular communication system supporting circuit-switched services, the network node comprising circuitry configured as:
a first communication unit configured to receive a message transmitted from the second cellular communication system, and to recognize that the message comprises congestion-related information indicative of the congestion status of the second cellular communication system; and
an updating unit configured to update a database of the network node of the first cellular communication system with the congestion-related information;
thereby enabling a user equipment for which the congestion-related information is accessible via the network node of the first cellular communication system or a controlling unit of the network node of the first communication system to control Circuit-switched Fallback (CSFB) attempts towards the second communication system based on the congestion-related information, prior to initiating any access signaling associated with the CSFB attempts.

12. The network node of claim 11, wherein the updating unit is configured to update persistence (PSIST) parameters of the second cellular communication system based on the congestion related information.

13. The network node of claim 11, further comprising a second communication unit that is configured to broadcast at least a part of the congestion-related information, thereby enabling a user equipment camping in the first cellular communication system to obtain an indication of the congestion status of the second cellular communication system based on the congestion-related information.

14. The network node of claim 11, wherein the controlling unit is configured to control a CSFB attempt by:

blocking a CSFB attempt or changing valid CSFB release if congestion is indicated by the congestion-related information, otherwise admitting a CSFB attempt in the event that no congestion is indicated by the congestion-related information.

15. The network node of any of claim 11, wherein the network node is any of an MME or an eNode B.

16. The network node of claim 11:

wherein the second cellular communication system is any of: a Global System for Mobile communications (GSM) system, a Wideband Code Division Multiple Access (WCDMA) system, and a packet-switched Long Term Extensions (LTE) to the Evolved Terrestrial Radio Access Network (E-UTRAN); and wherein the first cellular communication system is a Code Division Multiple Access 2000(CDMA 2000) system that includes single-carrier Radio Transmission Technology (1xRTT).

17. The network node of claim 11, wherein the Circuit-switched Fallback (CSFB) attempts are enhanced Circuit-switched Fallback (CSFB) attempts to 1xRTT (e1xCSFB).

* * * * *